US008634955B2

(12) United States Patent
Oaki et al.

(10) Patent No.: US 8,634,955 B2
(45) Date of Patent: Jan. 21, 2014

(54) MOBILE ROBOT AND METHOD FOR CONTROLLING MOBILE ROBOT

(75) Inventors: Junji Oaki, Kawasaki (JP); Fumio Ozaki, Naga-gun (JP); Nobuto Matsuhira, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 982 days.

(21) Appl. No.: 12/219,319

(22) Filed: Jul. 18, 2008

(65) Prior Publication Data

US 2009/0024250 A1 Jan. 22, 2009

(30) Foreign Application Priority Data

Jul. 18, 2007 (JP) ................................ P2007-187241

(51) Int. Cl.
*G06F 19/00* (2011.01)
(52) U.S. Cl.
USPC . 700/245; 700/253; 318/568.12; 318/568.16; 15/320; 901/1
(58) Field of Classification Search
USPC .................. 700/245, 253; 900/1; 318/568.12, 318/568.16; 15/320
See application file for complete search history.

(56) References Cited

U.S. PATENT DOCUMENTS

| 4,958,068 | A  | * | 9/1990  | Pong et al. ............... 250/222.1 |
| 6,394,203 | B1 | * | 5/2002  | Harris ........................ 180/7.1 |
| 6,481,515 | B1 | * | 11/2002 | Kirkpatrick et al. ......... 180/65.1 |
| 6,580,246 | B2 | * | 6/2003  | Jacobs ..................... 318/568.16 |
| 6,705,332 | B2 | * | 3/2004  | Field et al. ................. 134/102.1 |
| 6,810,305 | B2 | * | 10/2004 | Kirkpatrick, Jr. ............. 700/245 |
| 7,061,200 | B2 | * | 6/2006  | Iribe ....................... 318/568.16 |
| 7,761,954 | B2 | * | 7/2010  | Ziegler et al. ................... 15/320 |
| 7,818,090 | B2 | * | 10/2010 | Okamoto ..................... 700/253 |
| 2004/0034449 | A1 | * | 2/2004 | Yokono et al. ................ 700/245 |
| 2005/0000543 | A1 | * | 1/2005 | Taylor et al. ................... 134/18 |
| 2006/0106496 | A1 | * | 5/2006 | Okamoto ..................... 700/253 |
| 2008/0134458 | A1 | * | 6/2008 | Ziegler et al. ................... 15/320 |
| 2008/0155768 | A1 | * | 7/2008 | Ziegler et al. ...................... 15/4 |
| 2008/0231221 | A1 | * | 9/2008 | Ogawa ..................... 318/568.12 |
| 2009/0024250 | A1 | * | 1/2009 | Oaki et al. ..................... 700/245 |

FOREIGN PATENT DOCUMENTS

| JP | 07-257299  | 10/1995 |
| JP | 10-329071  | 12/1998 |
| JP | 2006-146491 | 6/2006 |

OTHER PUBLICATIONS

Office Action in Japanese Application No. 2007-187241 dated Mar. 17, 2009 and English-language translation thereof.

* cited by examiner

*Primary Examiner* — Khoi Tran
*Assistant Examiner* — Wae Louie
(74) *Attorney, Agent, or Firm* — Nixon & Vanderhye, P.C.

(57) ABSTRACT

A mobile robot includes: a main body; a drive unit that moves the main body; a contact force detecting unit that detects a contact force acting against an obstacle; and a controller that controls the drive unit to move the main body toward a target object under a condition that the contact force detected by the contact force detecting unit is in a predetermined range.

7 Claims, 4 Drawing Sheets

FIG. 4

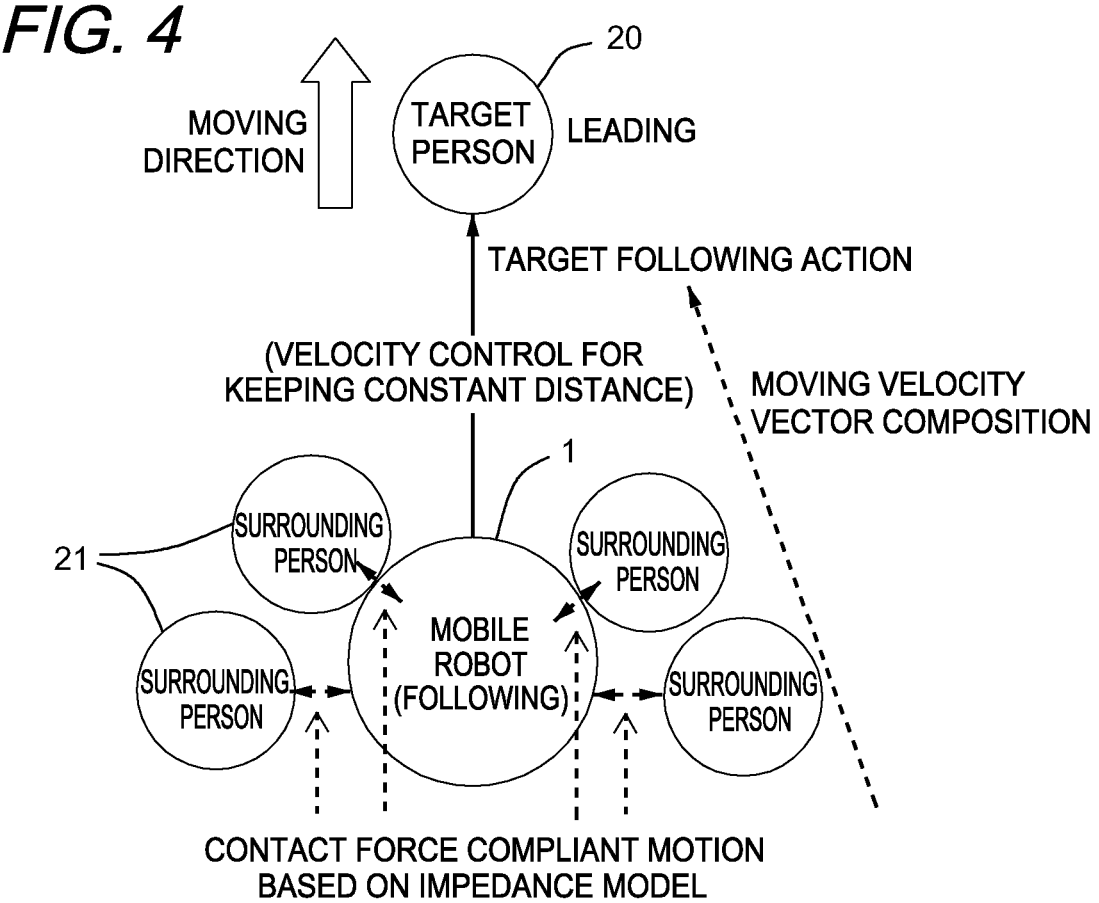

MOVING DIRECTION

TARGET PERSON 20 — LEADING

TARGET FOLLOWING ACTION (VELOCITY CONTROL FOR KEEPING CONSTANT DISTANCE)

MOVING VELOCITY VECTOR COMPOSITION

21 — SURROUNDING PERSON

SURROUNDING PERSON

MOBILE ROBOT (FOLLOWING) 1

SURROUNDING PERSON

SURROUNDING PERSON

CONTACT FORCE COMPLIANT MOTION BASED ON IMPEDANCE MODEL

FIG. 5

QUADRATIC TRANSFER FUNCTION $$G(s) = \frac{1}{Ms^2 + Ds + K}$$

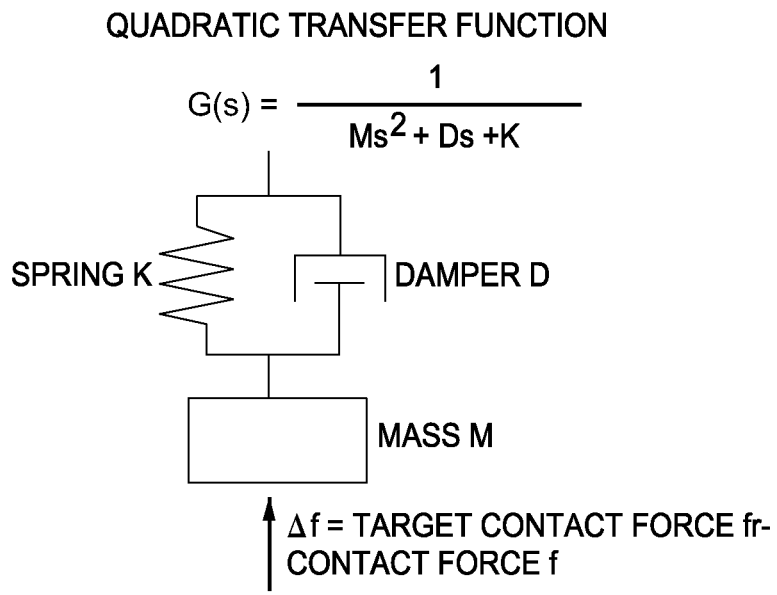

SPRING K

DAMPER D

MASS M $\Delta f$ = TARGET CONTACT FORCE $f_r$ − CONTACT FORCE $f$

_US 8,634,955 B2_

MOBILE ROBOT AND METHOD FOR CONTROLLING MOBILE ROBOT

RELATED APPLICATION(S)

The present disclosure relates to the subject matters contained in Japanese Patent Application No. 2007-187241 filed on Jul. 18, 2007, which are incorporated herein by reference in their entirety.

FIELD

The present invention relates to a mobile robot and a method for controlling the mobile robot, for safely moving toward a target in a situation, such as in a crowd of people, where being bumped with surrounding people and obstacles.

BACKGROUND

In a conventional mobile robot, there is used a control method to basically stop moving or to largely avoid a course of movement when people are around the robot while the robot is attempting to follow a target object, thereby securing a safety of the people.

An example of such technique is disclosed in JP-A-2006-146491.

However, conventional control method is nearly store, which follows a person through a crowd of people.

SUMMARY

One of objects of the present invention is to provide a mobile robot and a controller for the mobile robot, for safely moving toward a target in a situation where being bumped with surrounding obstacles including people, by controlling contact force between the mobile robot and the obstacles.

According to an aspect of the invention, there is provided a mobile robot including: a main body; a drive unit that moves the main body; a contact force detecting unit that detects a contact force acting against an obstacle; and a controller that controls the drive unit to move the main body toward a target object under a condition that the contact force detected by the contact force detecting unit is in a predetermined range.

According to another aspect of the invention, there is provided a method for controlling a mobile robot, wherein the mobile robot includes: a main body; a drive unit that moves the main body; and a contact force detecting unit that detects a contact force acting against an obstacle, and wherein the method includes: receiving the contact force from the contact force detecting unit; and controlling the drive unit to move the main body toward a target object under a condition that the contact force is in a predetermined range.

BRIEF DESCRIPTION OF THE DRAWINGS

In the accompanying drawings:

FIG. 4 is a concept diagram illustrating a target person following action and a contact force compliant motion according to the embodiment;

FIG. 5 is a diagram illustrating an impedance model defining characteristics in action of the mobile robot at the time of bumping into surrounding people.

DETAILED DESCRIPTION OF THE EMBODIMENTS

Hereinafter, a mobile robot and a controller for the mobile robot according to an embodiment of the present invention will be described with reference to the drawings.

In the following description, it is assumed that the mobile robot is used in a situation where the mobile robot follows a person leading at a predetermined distance in a retail store. The mobile robot is configured as a shopping cart robot that is used by a customer who walks and places a picked-up merchandise into the shopping cart robot.

Figure 2:
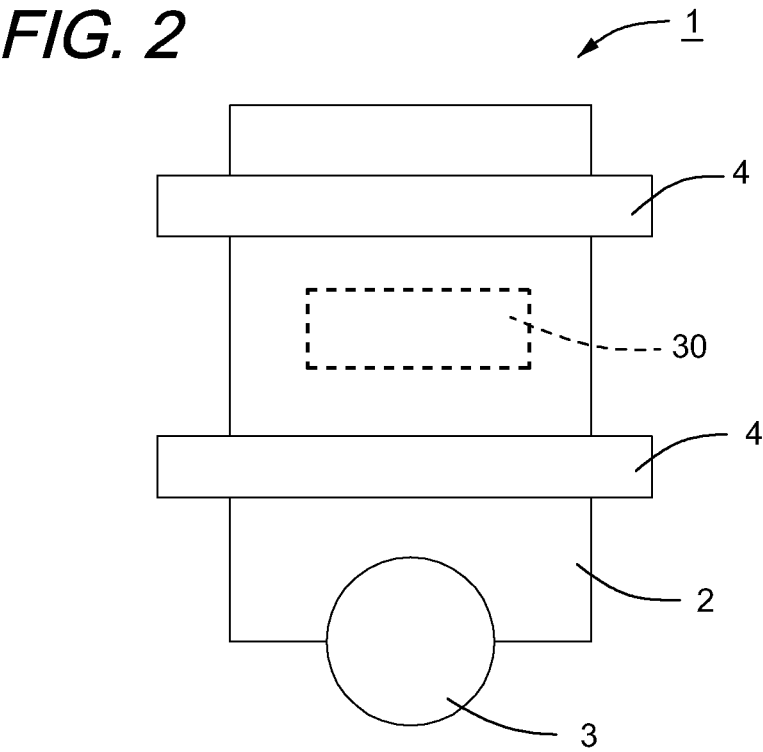
FIG. 2 is a schematic view illustrating an example of a contact force detecting mechanism according to the embodiment.

As shown in FIG. 2, a mobile robot 1 includes a robot body 2 and wheels 3 attached to the robot body 2, and the mobile robot 1 is movable in any direction on a floor. Contact force detecting mechanisms 4 are disposed around the robot body 2. The contact force detecting mechanisms 4 are preferably attached to a plurality of upper and lower positions of the robot body 2, to cope with high and low of surrounding people. A controller 30 is provided in the robot body 2. The controller 30 controls the wheels 3 to be driven based on an output of the contact force detecting mechanism 4.

For example, the wheel 3 may be used as a omni directional wheel like a spherical wheel. And the wheel 3 may be used as a single directional wheel.

Figure 3:
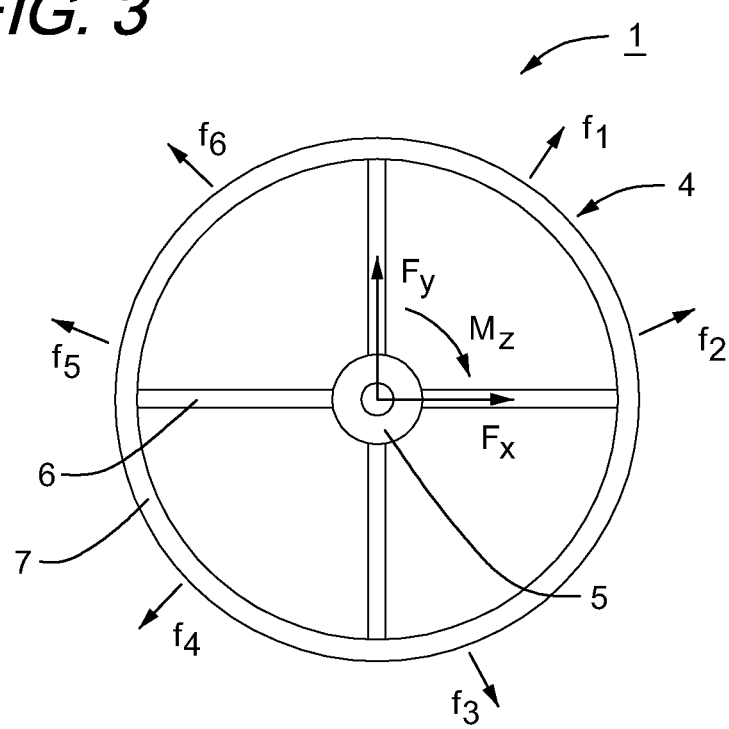
FIG. 3 is a schematic plan sectional view illustrating a configuration of the contact force detecting mechanism shown in FIG. 2.

FIG. 3 shows a configuration of the contact force detecting mechanism 4. A three-axis force sensor 5 fixed to a center shaft of the robot body 2 is disposed at the center of the contact force detecting mechanism 4, and four radial members 6 extending from the three-axis force sensor 5 in a radial direction are disposed. A ring member 7 is disposed to connect leading ends of the radial members 6 in a circumferential direction. The ring member 7 is disposed to protrude from an outer periphery of the robot body 2. The radial members 6 are disposed to penetrate the robot body 2 at an opening formed on the robot body 2, and transfer a contact force applied from the ring member 7 to the three-axis force sensor 5 without interference from the robot body 2.

The three-axis force sensor 5 detects two-dimensional forces FX and FY on the plane and a moment MZ, for example. A "6 DoF force/torque sensor system (Product Name)" that is available on the market from Nitta Corporation may be used as the three-axis force sensor 5.

A touch force sensor (now shown) that detects contact forces f1 to f6 with a person is surrounded around the whole ring member 7. The three-axis force sensor 5 detects a composite force applied to the mobile robot 1, while the touch force sensor detects which portion of the mobile robot 1 is contacting with a person with how much force. The composite force applied to the mobile robot 1 may be calculated using information of a torque sensor provided at a driving shaft of the wheel 3.

FIG. 4 shows a situation in which the mobile robot 1 follows a target person 20 who leads the mobile robot 1. Generally, the mobile robot 1 is controlled to move to keep a constant distance from the target person (leading person) 20. However, when the mobile robot 1 cannot find a movable space for the mobile robot 1 toward the target in the crowd of people, the mobile robot 1 detects a contact force with surrounding people 21 and advances to move forward with an appropriate contact force.

Figure 1:
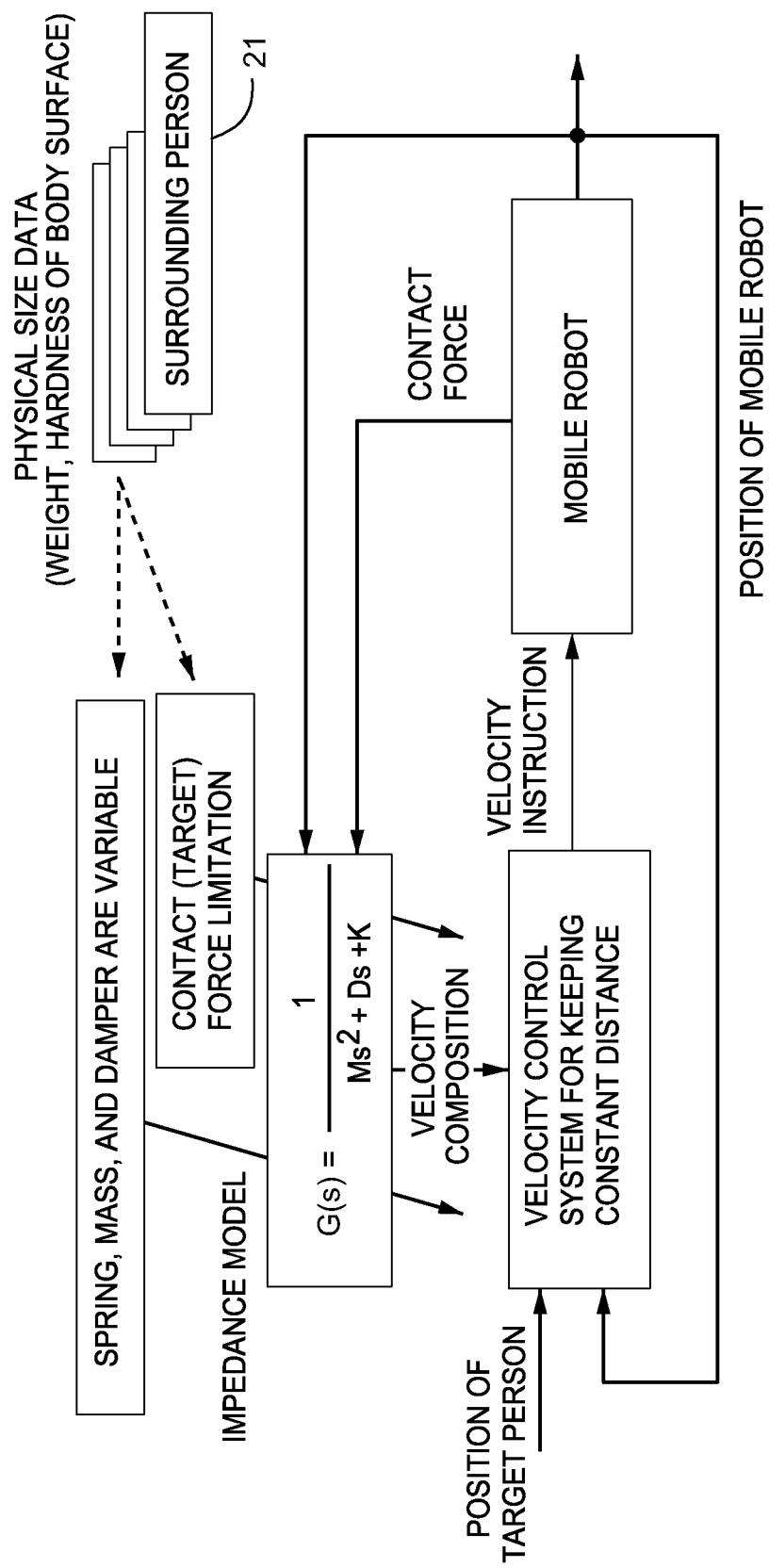
FIG. 1 is a block diagram illustrating a controller of a mobile robot according to an embodiment of the present invention.

FIG. 1 shows a control block diagram of the controller 30 of the mobile robot 1. First, a distance from a leading target person 20 is detected by a main feedback loop, and a velocity of the mobile robot 1 is controlled to keep the distance in a constant range. When the mobile robot 1 is in contact with the surrounding people 21, the controller 30 generates a velocity vector for realizing a compliant motion (impedance model control) to reduce the contact force and combines the generated velocity vector with a velocity control system that keeps a constant distance with the target person.

The controller 30 sets a target value of a predetermined contact force in accordance with a physical size of the surrounding people 21, and the mobile robot 1 advances while safely being in contact with the surrounding people 21 based on the compliant motion of the impedance (spring, mass, and damper) model defining characteristics in action at the time of contact.

FIG. 5 shows an impedance model defining characteristics in action at the time of contact. Specifically, a filter G(s) represented by a quadratic transfer function represented by the following equation (1) may be realized.

$$G(s) = 1/(Ms^2 + Ds + K) \quad (1)$$

In the equation (1), M denotes a mass, D denotes a damper, and K denotes a spring constant.

An output at the time of inputting an external force Δf represented by the following equation (2) is composed to a constant distance keeping control system and a velocity instruction to the mobile robot may be generated.

$$\Delta f = \text{TARGET CONTACT FORCE } fr - \text{CONTACT FORCE } f \quad (2)$$

When a contact force or an acceleration exceeds an (predetermined) upper limit, the spring constant of the impedance model is changed to zero (or small value) and thus a safe control to put a body in the crowd of people is performed. The upper limit of the contact force and the mass constant (upper limit of acceleration) of the impedance model is changed with a weight of a contact person. In case of bumping into a plurality of people, the upper limit of the contact force and the mass constant of the impedance model is changed with the weight of the lightest person.

The position of the target person 20 may be obtained by use of a radio tag, an image captured by a camera, a distance sensor, or the like (not shown). The physical size (weight or hardness of body surface) of the surrounding people 21 may be obtained by use of a radio tag, on-line data detected by a robot, or the like.

The controller 30 may control the movement of the mobile robot 1 as follows. When the contact force exceeds a first critical value, the mobile robot 1 is stopped. When the contact force is larger than a second critical value (first critical value<second critical value), an avoiding action of moving the mobile robot 1 in a direction of an external force that generates the contact force is performed. Accordingly, it is possible to improve the safety of the mobile robot 1.

The controller 30 may control the movement of the mobile robot 1 as follows. An acceleration of the mobile robot 1 is detected or calculated. When the acceleration exceeds the first critical value, the moving robot 1 is stopped. When the acceleration is larger than the second critical value (first critical value<second critical value), the moving robot 1 is driven in a direction of the external force. Accordingly, reckless driving of the mobile robot 1 is suppressed, and the external force applied to the mobile robot 1 is attenuated, thereby preventing the mobile robot 1 from being destroyed.

Figure 6:
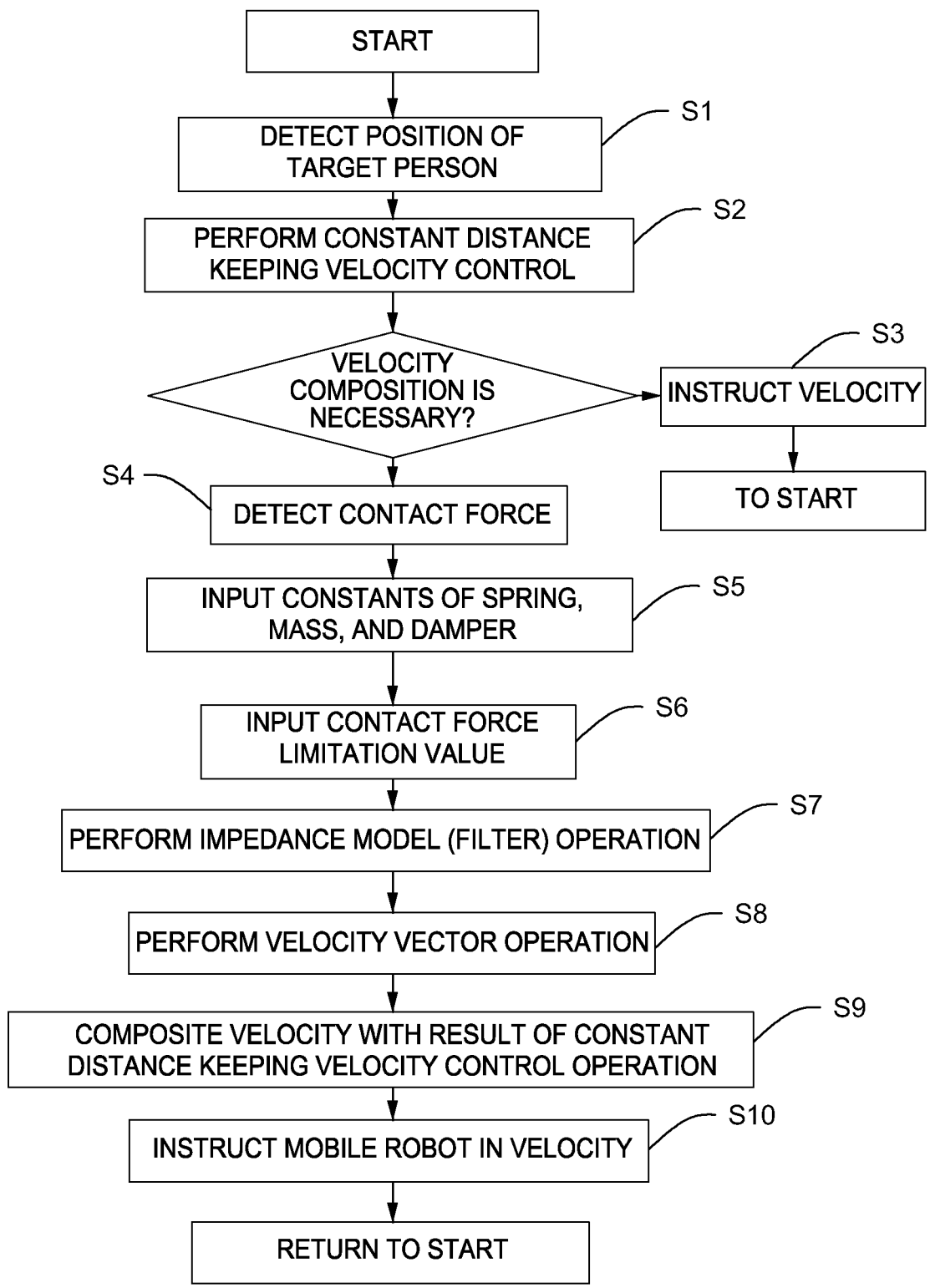
FIG. 6 is a flowchart illustrating a composite action of a following action and a contact force compliant motion in the mobile robot.

FIG. 6 shows a flowchart for generating a velocity instruction to the mobile robot 1 by composing the aforementioned following action and the contact force compliant motion. That is, a position of the target person is detected (Step S1), and then a constant distance keeping velocity control operation is carried out (Step S2). In case where the velocity composition is not necessary, the velocity instruction is commanded (Step S3). In case where the velocity composition is necessary, the contact force is detected (Step S4), constants of the spring, mass, and damper are input (Step S5), a contact force limitation value is input (Step S6), and then an impedance model (filter) operation is carried out (Step S7). A velocity vector operation is carried out on the basis of the result (Step S8), and then a velocity composition with the result of the constant distance keeping velocity control operation is carried out (Step S9). A velocity instruction is commanded to the mobile robot 1 (Step S10).

Basically, a translational two-dimensional force detected by the three-axis force sensor 5 may be superposed upon a translational velocity instruction, and a linear rotational moment may be superposed upon a rotational velocity instruction. However, a force that can be detected by the three-axis force sensor is a composite force. Accordingly, actually, the velocity instruction is limited to the force of the mobile robot 1 and the surrounding person 21 detected by the surrounding touch sensor.

The above-described embodiment is described as only an example, and the present invention is not limited to the specific configuration described above. For example, in a case where the mobile robot 1 having a map of the store leads a person while passing through the crowd of people toward a target, the mobile robot 1 may be configured similarly as described above. In addition, in a case where the mobile robot 1 follows a person in the crowd of people outdoor or leads the person, similar configuration is applicable. Moreover, the target or the surrounding obstacle is not limited to a person, and may be a non-mobile object or a mobile object, for example, another mobile robot.

As described above, according to the present invention, it is possible to control a mobile robot to move toward the target while the mobile robot safely contacts with the surrounding obstacles by controlling the contact force between the mobile robot and the obstacles such as surrounding people.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A mobile robot comprising:
a main body;
a drive unit that moves the main body;
a contact force detecting unit that measures a contact force between the mobile robot and an obstacle;
an input unit that inputs information indicating characteristics of the obstacle to the controller, the characteristics including a weight of a person or a hardness of a body surface of the person in a case in which the obstacle is the person;

a target position detecting unit that detects a target position that indicates a relative position of a target object from the main body;

a controller that controls the drive unit to move the main body toward the target position under a condition that the contact force measured by the contact force detecting unit is in a predetermined contact force range so as to keep the contact force, the controller changing the predetermined contact force range in accordance with the information input by the input unit, wherein the controller includes:

a velocity control unit that controls a velocity of movement of the main body to control a distance between the target position and a position of the main body to be in a predetermined distance range;

a velocity vector generating unit that generates a velocity vector based on an impedance model using the contact force as an input;

a moving velocity composing unit that composes an output of the velocity control unit for keeping the constant distance and the velocity vector generated by the velocity vector generating unit; and a contact force attenuating unit that changes a spring constant of the impedance model to a value smaller than a current spring constant when the contact force measured by the contact force detecting unit exceeds a predetermined value, wherein the controller changes the predetermined contact force range in accordance with the information input by the input unit.

2. The mobile robot according to claim 1, wherein the controller further includes:

a stopping unit that stops movement of the main body when the contact force is larger than a first predetermined value; and an avoiding unit that avoids movement of the main body in a direction toward an external force that applies the contact force to the main body when the contact force is larger than a second predetermined value that is larger than the first predetermined value.

3. The mobile robot according to claim 1, wherein the velocity vector generating unit generates the velocity vector based on an impedance model G(s) defined by the following equation (1), wherein M is a mass, D is a damper, and K is a spring constant $$G(s) = 1/(Ms^2 + Ds + K) \quad (1).$$

4. The mobile robot according to claim 1, wherein the contact force detecting unit comprises a touch force sensor mounted on a ring member protruding from an outer periphery of the main body.

5. The mobile robot according to claim 1, wherein when the mobile robot is in a crowd and the velocity control unit determines that the distance is above the predetermined distance range, the contact force detecting unit measures the contact force between the mobile robot and a person in the crowd, and the controller controls the main body to move around the person in the crowd under the condition that the contact force is in the predetermined contact force range and to move toward the target position.

6. A method for controlling a mobile robot, wherein the mobile robot includes:

a main body;

a drive unit that moves the main body; and a contact force detecting unit that measures a contact force between the mobile robot and an obstacle;

an input unit that inputs information indicating characteristics of the obstacle to the controller, the characteristics including a weight of a person or a hardness of a body surface of the person in a case in which the obstacle is the person; and a target position detecting unit that detects a target position that indicates a relative position of a target object from the main body, wherein the method comprises:

receiving the measured contact force from the contact force detecting unit;

controlling the drive unit to move the main body toward the target position under a condition that the measured contact force is in a predetermined range so as to keep the contact force;

controlling a velocity of movement of the main body to control a distance between the target position and a position of the main body to be in a predetermined distance range;

generating a velocity vector based on an impedance model using the contact force as an input;

composing an output of the velocity control unit for keeping the constant distance and the velocity vector generated by the velocity vector generating unit;

changing a spring constant of the impedance model to a value smaller than a current spring constant when the contact force measured by the contact force detecting unit exceeds a predetermined value; and changing the predetermined contact force range in accordance with the information input by the input unit.

7. The mobile robot according to claim 4, wherein the touch force sensor detects which portion of the mobile robot is contacting with the obstacle with how much force.

* * * * *